US012235485B1

(12) United States Patent
Jones

(10) Patent No.: US 12,235,485 B1
(45) Date of Patent: Feb. 25, 2025

(54) LIGHT-MIXING DEVICES WITH HIGHLY REFLECTIVE SURFACES

(71) Applicant: Fraen Corporation, Reading, MA (US)

(72) Inventor: Carlton S. Jones, Boxford, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 18/434,071

(22) Filed: Feb. 6, 2024

(51) Int. Cl.
*G02B 6/00* (2006.01)
*F21V 8/00* (2006.01)
*G02B 1/00* (2006.01)

(52) U.S. Cl.
CPC .......... *G02B 6/0031* (2013.01); *G02B 1/005* (2013.01); *G02B 6/003* (2013.01); *G02B 6/0073* (2013.01); *G02B 6/0096* (2013.01)

(58) Field of Classification Search
CPC ...... G02B 6/0031; G02B 6/005; G02B 6/003; G02B 6/0073; G02B 6/0096
USPC ........................................................ 385/129
See application file for complete search history.

(56) References Cited

U.S. PATENT DOCUMENTS

| 2012/0069597 A1* | 3/2012 | Sone .................. G02B 19/0019 |
| | | 362/609 |
| 2016/0370534 A1* | 12/2016 | Liu ....................... G02B 6/0055 |
| 2018/0274751 A1* | 9/2018 | Kennedy .............. G02B 6/0096 |
| 2019/0278018 A1* | 9/2019 | Angelini ............... G02B 6/0008 |

FOREIGN PATENT DOCUMENTS

CN 101821862 B * 7/2013 ............. B82Y 20/00

OTHER PUBLICATIONS

Toplite New Optic Design, Optics Brochure 2023, Toplite International Co., Ltd., first two pages plus p. 63.

* cited by examiner

Primary Examiner — Jerry M Blevins
(74) *Attorney, Agent, or Firm* — Potomac Law Group, PLLC; Reza Mollaaghababa; Reza Sadr

(57) ABSTRACT

In one aspect, an optical system is disclosed, which includes a light guide having an input end for receiving light from at least one light source and an output end through which light exits the light guide, said light guide further having at least one highly reflective surface positioned to provide specular reflection of at least a portion of the light entering via the input end of the light guide, where the highly reflective surface exhibits a specular reflectance of at least about 95% for light with one or more wavelengths in a wavelength range of about 380 nm to about 780 nm.

46 Claims, 13 Drawing Sheets

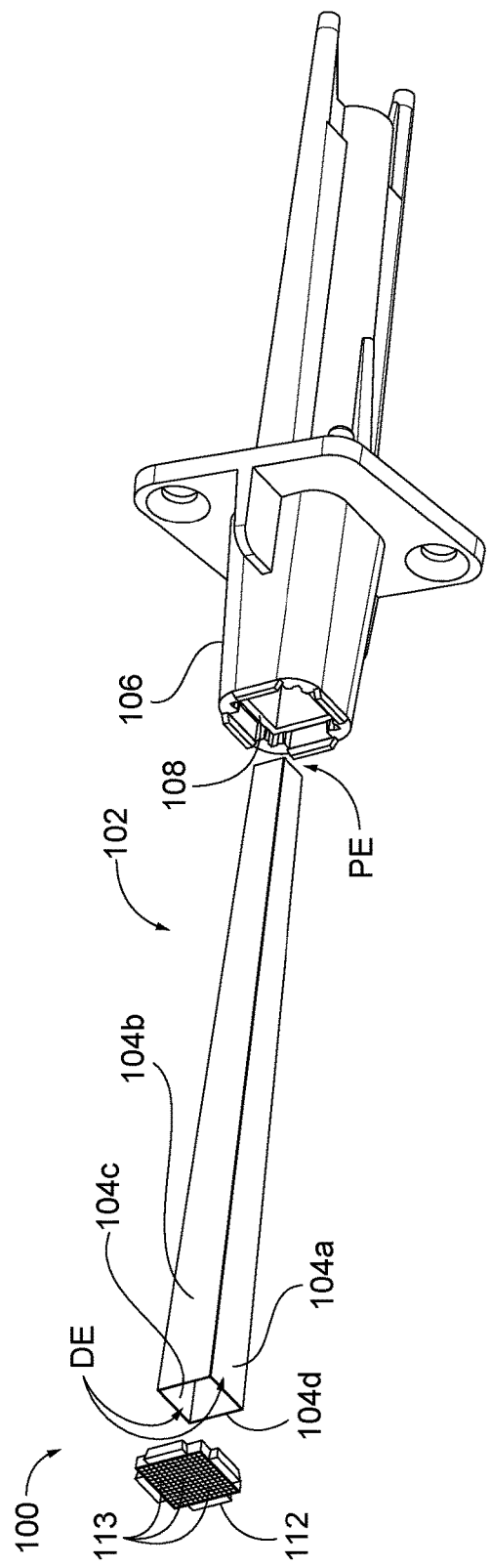
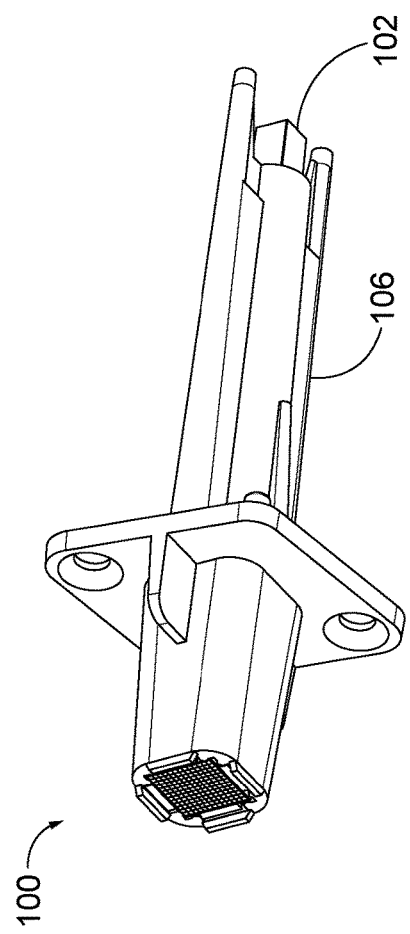
FIG. 1A
FIG. 1B

LIGHT-MIXING DEVICES WITH HIGHLY REFLECTIVE SURFACES

FIELD

The present disclosure generally relates to lighting systems and light guides that can be employed in such lighting systems, such as light guides that can be employed for light mixing and/or color mixing.

INTRODUCTION

Lighting systems for light sources, such as light emitting diodes, can have a wide variety of configurations. In many cases, a particular configuration can be characterized by the illumination pattern it produces, by the coherence, intensity, efficiency and uniformity of the light projected by it, and so on. The application for which the lighting system is designed may demand a high level of performance in many of these areas.

Many applications call for the ability to mix light from multiple sources, e.g., sources producing light of different colors. Further, light mixing is also useful for systems with large light sources. In both cases, it is difficult to produce uniformly mixed light and reduce source imaging.

Moreover, the development of high-power light emitting diodes (LEDs) require the use of light guides that can withstand high temperatures. Plastic light guides are not typically capable of withstanding high temperatures that arise as a result of using high-power LEDs and silicone light guides, though typically capable of withstanding such high temperatures, are expensive.

Accordingly, there is a need for improved lighting systems, and in particular light guides that can be used in such lighting systems.

SUMMARY

In one aspect, an optical system is disclosed, which includes a light guide having an input end for receiving light from at least one light source and an output end through which light exits the light guide, said light guide further having at least one highly reflective surface positioned to provide specular reflection of at least a portion of the light entering via the input end of the light guide, where the highly reflective surface exhibits a specular reflectance of at least about 95% for light with one or more wavelengths in a wavelength range of about 380 nm to about 780 nm or in any subrange within this wavelength range, e.g., in a wavelength range of about 400 nm to about 700 nm. In some embodiments, the highly reflective surface can exhibit a specular reflectance of at least about 96%, or at least about 97%, or at least about 98%, or at least about 99% or even 100% for light in the wavelength range of about 380 nm to about 780 nm, or in any subrange within this wavelength range.

In various embodiments, the highly reflective surface can exhibit the above reflectance of light at incident angles in a range of about 0 to about 90 degrees, e.g., in a range of about 10 degrees to about 80 degrees, or in a range of about 20 degrees to about 70 degrees, or in a range of about 30 degrees to about 60 degrees, or in a range about 40 degrees to about 50 degrees.

In various embodiments, the highly reflective surface forms a one-dimensional photonic crystal, e.g., characterized by a periodic arrangement of a plurality of dielectric layers having different refractive indices.

In various embodiments, the at least one light source can include a plurality of light sources that are positioned relative to the input end of the light guide such that at least a portion of the light emitted by the plurality of the light sources is introduced into the light guide. The reflection of at least a portion of the light rays entering the light guide via its specularly reflective surfaces can cause mixing of the light rays as they propagate along the light guide.

In various embodiments, the light guide can include a hollow interior that is surrounded by the at least one highly reflective surface. In some such embodiments, the at least one highly reflective surface can include a plurality of highly reflective surfaces (herein also referred to as surface portions) that collectively form the light guide and surround its hollow interior.

The light guide can have a variety of different cross-sectional profiles. In some embodiments, the light guide can have a polygonal cross-sectional profile, such as a hexagonal, or octagonal profile. In other embodiments, the light guide can have a circular or an elliptical profile. Further, in some embodiments, the light guide can exhibit different cross-sectional profiles from its input end to its output end, e.g., a transition from a polygonal cross-sectional profile to a circular cross-sectional profile.

In various embodiments, the light guide can include a solid waveguide on at least one surface thereof a film having a highly reflective surface is positioned such that the highly reflective surface is in proximity of or in contact with the at least one surface of the solid waveguide. In some cases, all surfaces of the solid waveguide are covered by such a highly reflective surface. By way of example, the solid waveguide can be formed of a plastic, glass or silicone. Further, the highly reflective surface of the film can be formed as a one-dimensional photonic crystal, e.g., as a periodic layers of dielectric materials with difference refractive indices.

In some embodiments, the light guide includes a side opening, i.e., an opening formed in at least one side wall thereof, to receive light from another light source that is positioned relative to that opening such that at least a portion of the light emitted by the other light source entering the light guide can be reflected by one or more reflective surfaces of the light guide so as to be mixed with the light received from the at least one light source. The mixture of the light rays associated with the two light sources can exit the light guide via its output end.

In various embodiments, at least one light source can be positioned in the hollow interior of the light guide, e.g., in a proximal region of the light guide. In some such embodiments, at least one light source can be disposed on a printed circuit board (PCB) with the input end of the light guide coupled to the PCB such that the light source is positioned within the hollow interior of the light guide.

In various embodiments, the at least one light source can include at least one light emitting diode (LED) generating light at a power in a range of about 1 Watt to about 100 Watts.

In a related aspect, an optical system is disclosed, which includes a light guide having a hollow interior, a specularly highly reflective inner surface bounding the hollow interior, an open input end through which light from at least one light source, e.g., one or more LEDs, can enter the hollow interior, and an open output end through which the light can exit the hollow interior. The optical system can further include a light-shaping element having an input surface that is optically coupled to the open output end of the light guide so as to receive at least a portion of the light exiting the light guide and an output surface through which light can exit the light-shaping element to provide an output light pattern. By way of example, the light-shaping element can include a plurality of microlenses and/or surface texturing. In some such embodiments, the plurality of microlenses can have a hemispherical shape with a diameter, e.g., in a range of about 1 mm to about 2 mm.

In some embodiments, a projection lens can be optically coupled to the output surface of the light-shaping element to receive the light passing through the light shaping element and direct the light onto a target surface.

In the above optical system, the highly reflective surface can correspond to an inner surface of a film that is shaped to form the light guide. By way of example, and without limitation, the film having the reflective surface can have a thickness in a range of about 60 µm to about 90 µm. Further, in various embodiments, the highly reflective surface can exhibit a high reflectance, e.g., a reflectance in a range of about 95% to 99%, or higher, for any polarization of incident light and for an unpolarized light.

In some embodiments, the shaped film forming the light guide can have a polygonal cross-sectional profile, e.g., a hexagonal or an octagonal profile, while in other embodiments it can have a circular or an elliptical cross-sectional profile.

In various embodiments, the optical system can further include a holder having an inner bore in which the light guide can be positioned.

In various embodiments, the light guide can have a tapered profile with the input end having a smaller area than its output end. The light guide's taper may be characterized by an angle in a range of about 5 degrees to about 20 degrees, by way of example.

In another aspect, an optical system for delivering light into a light guide (e.g., an optical fiber) is disclosed, where the optical system includes a white light source for generating white light and a red-light emitting diode for generating red light. The optical system further includes a light-delivery system for delivering at least a portion of the white light and the red light into an input port of the light guide. The light-delivery system includes one or more lenses for focusing the white light into the input port of the light guide and a reflective elliptical film having a highly reflective surface optically coupled to said red LED and having a reflective surface configured to specularly reflect and direct said at least a portion of the red light into the input port of the optical fiber. In various embodiments, the red light and the input port of the light guide are positioned at or in proximity of the focal points of the elliptical film to allow an efficient transfer of the red light into the optical fiber.

Further understanding of various aspects of the present teachings can be found in the following detailed description in conjunction with the associated drawings, which are described briefly below.

BRIEF DESCRIPTION OF THE DRAWINGS

The skilled person in the art will understand that the drawings, described below, are for illustration purposes only. The drawings are not intended to limit the scope of the applicant's teachings in any way. Like numerals are utilized to designate similar features of various embodiments.

FIG. 1A is a schematic perspective exploded view of a light module according to an embodiment, FIG. 1B is a schematic perspective view of the light module illustrated in FIG. 1A in an assembled state.

DETAILED DESCRIPTION

Figure 1C:
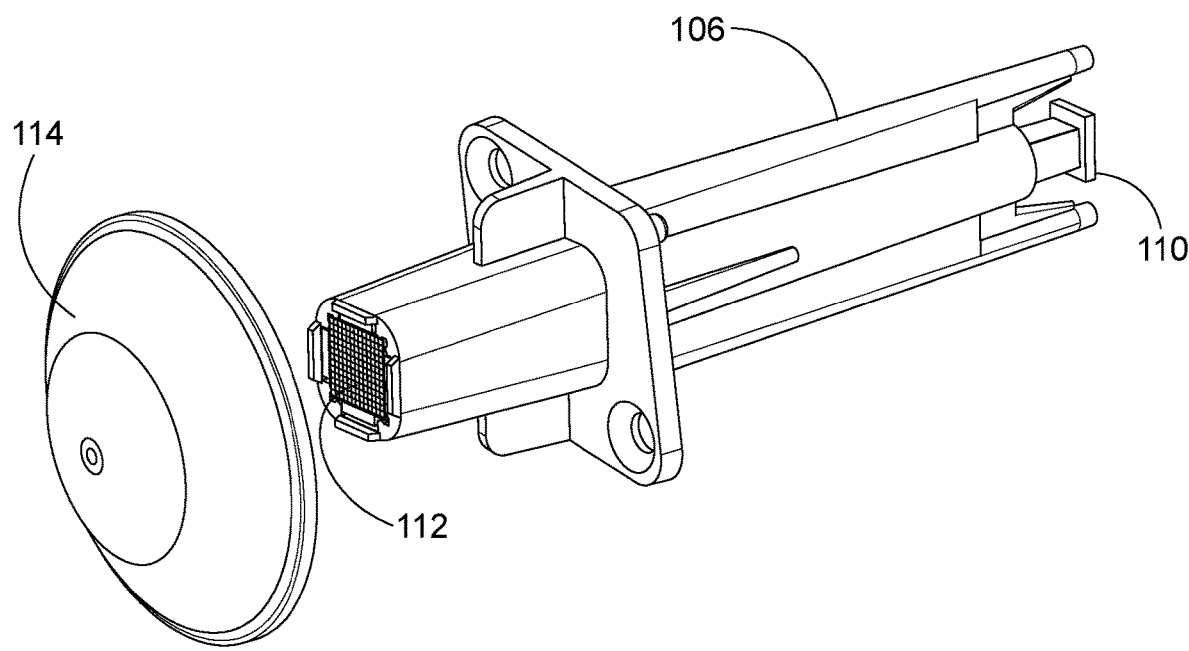
FIG. 1C is a schematic perspective view of a light module according to an embodiment of the present teachings.

The present application discloses, among other things, lighting modules and lighting systems containing one or more lighting modules, and associated methods, that receive light from one or more light sources for projecting it onto a target surface, e.g., in a uniform, patterned, or other controlled manner. In various embodiments, the lighting modules and lighting systems can be used to mix the light generated by one or more sources. By way of example, the projected light can be homogenized so as to create an output distribution of substantially uniform luminosity. In many cases, two or more light sources can be used to generate light of different wavelengths. In various embodiments, the lighting modules and systems can be effective to mix the light of different colors. Further, in some embodiments, the lighting systems of the invention can be utilized for effective mixing of light generated by spatially separate individual sources of single color that collectively make up a single large source of light.

The devices and methods disclosed herein can be used with a wide variety of light sources, including light-emitting-diodes and incandescent bulbs, or other coherent or non-coherent sources. Such devices and methods can have a wide range of applications, including, for example, in spot lighting, customizable/adjustable lighting systems, household lighting, flashlights, wearable headlamps or other body-mounted lighting, among others.

Throughout this application, the term "e.g." will be used as an abbreviation of the non-limiting term "for example." It should be understood that regardless of whether explicitly stated or not, all characteristics of the lighting modules and lighting systems described herein are by way of example only, and not necessarily requirements. All figures merely depict exemplary embodiments of lighting modules and/or systems that incorporate various aspects of the applicants' teachings. Further, the features of one embodiment can be combined with those of any other embodiment. The term "about" is used herein to denote a variation of at most 5% of a numerical value.

The term "specular reflection" and similar phrases are used in a way commonly understood in the art. By way of further illustration, the term "specular reflection" as used herein refers to a type of reflection that occurs when light rays encounter a smooth, polished surface and are reflected in a single, well-defined direction characterized by a reflection angle that is the same as the angle of incidence. It should, however, be understood that in the context of the present teachings a surface providing specular reflection may also provide diffuse reflection of some light rays, e.g., due to irregularities on the surface.

The term "photonic crystal" is used herein consistent with its ordinary meaning in the art to refer to a material with a periodic arrangement of a plurality of material constituents exhibiting refractive index contrast. The material constituents typically have sizes that are comparable to the wavelength of light. The term "a one-dimensional photonic crystal" in turn refers to a photonic crystal where the periodic variation of the refractive index occurs along one spatial dimension. For example, a periodic stack of a plurality of two-dimensional layers of two or more dielectric materials can form such a one-dimensional photonic crystal.

The terms "reflectance" and "reflectivity" are used herein interchangeably to refer to the ratio of light reflected from a surface relative to light incident on that surface. Reflectance can be expressed as a fraction of the amount of light striking a surface that is reflected by the surface. Typically, the reflectance can be expressed as the ratio of the reflected light intensity relative to the respective incident light intensity.

The term "highly reflective surface" as used herein refers to a surface that provides specular reflection of light having a wavelength in a range of about 380 nm to about 780 nm at a reflectance of at least about 95%, e.g., in a range of about 96% to about 98%.

The terms "light guide" and "light pipe" are employed herein interchangeably to refer to a structure that allows transfer of light from one end thereof to another.

With reference to FIGS. 1A and 1B, an embodiment of an optical system (herein also referred to as a lighting module) 100 according to the present teachings includes a light guide 102 (herein also referred to as a light pipe) having highly reflective surfaces as discussed in more detail below for causing a specular reflection of the light incident thereon. In this embodiment, the light pipe 102 extends from a proximal end PE to a distal end DE. The light pipe 102 exhibits an increasing cross-sectional area from its proximal end PE to its distal end DE, which in various embodiments can be characterized by a draft angle in a range of about 5° to about 20°, though other draft angles can also be utilized. Further, in some embodiments, the light pipe can have a substantially uniform cross-sectional area extending from its proximal end to its distal end. In this embodiment, the light pipe 102 includes four reflective lateral walls 104*a*, 104*b*, 104*c*, and 104*d* (herein referred to collectively as reflective lateral surfaces or simply as lateral sides 104) each of which includes an inner reflective surface that can provide specular reflection of light incident thereon with a high degree of reflectivity, e.g., greater than about 95% and preferably greater than about 98%.

In this embodiment, the internal space circumscribed by the lateral sides 104 of the light pipe is hollow. As discussed in more detail below, in various embodiments, the hollow interior of the light pipe can advantageously allow the use of high-power light sources, e.g., LEDs generating light at a power in a range of about 1 Watt to about 100 Watts.

While in this embodiment the light pipe 102 has a square cross-sectional profile, in other embodiments other polygonal cross-sectional profiles, such as hexagonal, octagonal, and star-shaped cross-sectional profiles can be employed. In other embodiments, the cross-sectional shape of the light pipe can be circular or elliptical. Alternatively, the light pipe may have an irregular cross-sectional shape.

As discussed in more detail below, in some embodiments, the light generated by one or more light sources, e.g., a plurality of light-emitting diodes (LEDs) generating light at different wavelengths (colors), that are positioned external to the light pipe, or within a proximal region of the light pipe, can be received by the light pipe via its proximal end PE. At least a portion of the received light undergoes multiple reflections via the reflective surfaces of the lateral sides 104 to reach the light pipe's distal end (DE) through which the light exits the light pipe. A portion of the light can pass through the hollow interior of the light pipe without striking its lateral surfaces to exit via its distal end.

In various embodiments, the reflective surfaces of the lateral sides 104 of the light pipe 102 are formed of a material that can provide specular reflection of the light incident thereon at a reflectance (herein also referred to as a reflectivity) of at least about 95% for light with one or more wavelengths in a range of about 380 nm-780 nm, e.g., in a range of about 400 nm to about 700 nm. By way of example, in some embodiments, the lateral surfaces can be formed of a one-dimensional photonic crystal reflective film configured to provide the desired reflectivity, e.g., a reflectivity of at least about 95%, or at least about 96%, or at least about 97%, or at least about 98%, or at least about 99%, such as a reflectivity of 99.9%. In some embodiments, the reflective film can have a thickness in a range of about 60 µm to about 90 µm, by way of example. An example of a suitable reflective material is marketed by 3M™ corporation of Minnesota, U.S.A. under the designation Enhanced Specular Reflective (ESR) film.

With continued reference to FIGS. 1A and 1B, in this embodiment, the lighting module 100 includes a holder 106 in which the reflective light pipe 102 can be seated. The holder 106 can have a variety of configurations but generally defines a bore 108 in which the light pipe 102 can be disposed. In various embodiments, the bore 108 can have a cross-sectional area that is generally configured to match that of the light pipe 102. Accordingly, the light pipe 102 can be inserted into the bore 108 and can be retained therein, at least partially, for example, by way of a frictional fit.

With reference to FIG. 1C, in various embodiments, the holder 106 can also be configured to seat a light source 110. By way of example, a proximal end of the holder 106 can include a cavity for receiving the light source 110. In various embodiments, the light source 110 can include a plurality of light-emitting elements, such as a plurality of LEDs, that emit light at different wavelengths.

With continued reference to FIG. 1C as well as FIGS. 1A and 1B, the light module 100 includes a light-shaping element 112 that can be coupled to a distal end of the holder 106 so as to receive the light exiting the light pipe. By way of example, and without limitation, the light-shaping element 112 can include a plurality of microlenses 113, which can cause further mixing of the light rays exiting the light pipe. In this embodiment, the microlenses form a two-dimensional array and can be formed, for example, of plastic, glass or silicone. In this embodiment, each microlens can have a diameter in a range of about 1 mm to about 2 mm. As will be appreciated by a person skilled in the art, the light-shaping element 112 can be implemented using other structures for spreading or mixing the light, such as surface texturing (e.g., texturing created in the die-mold or using chemical or mechanical etching or roughening).

Figure 2:
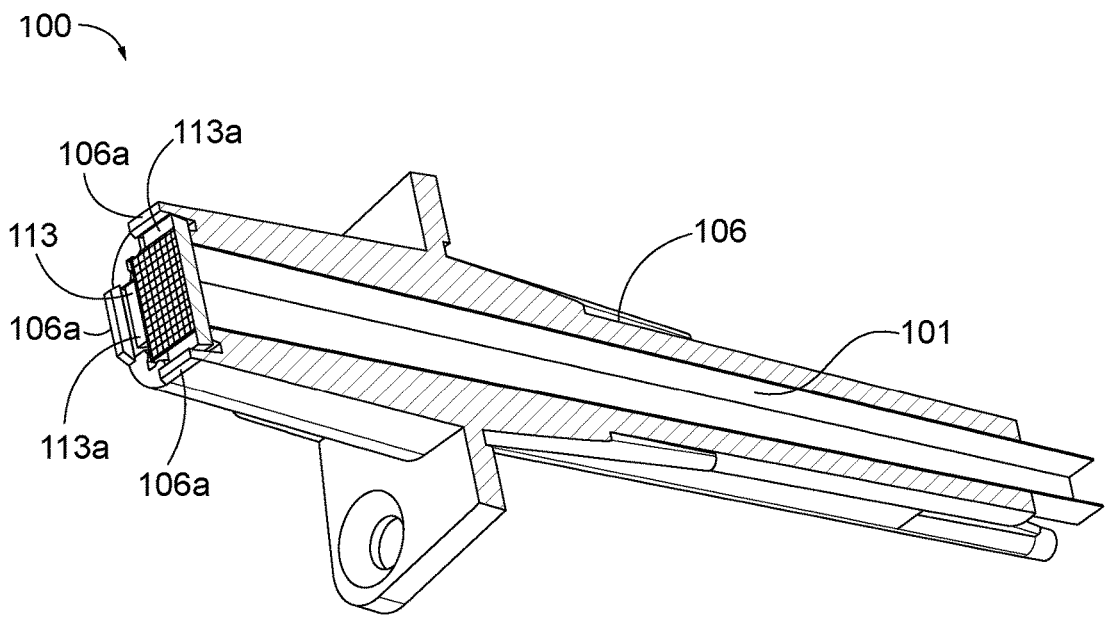
FIG. 2 is a cross-sectional view of the light pipe depicted in FIG. 1B.

Referring to FIG. 2, which is a partial longitudinal cross-sectional view of the light pipe depicted in FIG. 1B, in some embodiments, the microlens array 113 can be used to secure the light pipe 102 within the bore 108 of the holder 106. By way of example, to secure the microlens array into the holder, heat-staking (melting) of the tabs 106a of the holder onto a flange 113a of the microlens array can be employed.

Figure 3:
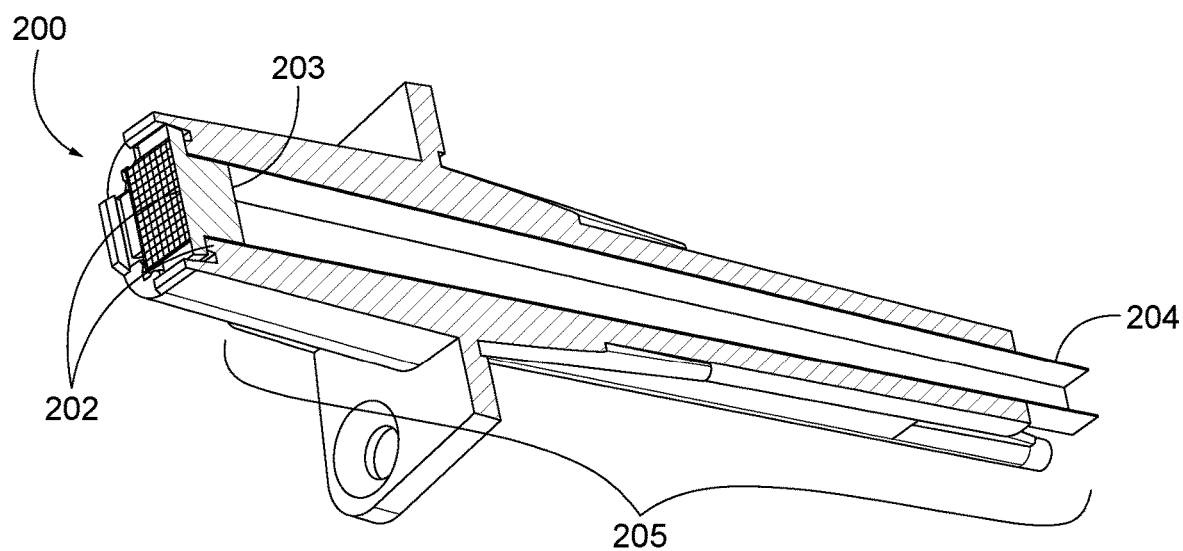
FIG. 3 is a cross-sectional view of an embodiment of a light-shaping module having an extension that forms a portion of the lateral surfaces of the light guide.

FIG. 3 in turn shows another light-shaping element 200 that includes, in addition to a plurality of microlenses 202, a reflective portion 203 that forms a distal portion of a light pipe 204 having another portion 205 that is formed of a highly reflective film, such as that discussed above. The reflective portion 203 can help maintain the shape of the portion of the light pipe that is formed of the highly reflective film Referring again to FIG. 1C, in this embodiment, a zoom lens 114 can receive the light passing through the light-diffusing element and focus the light onto a target surface. In other embodiments, the light module 100 may be employed without a zoom lens.

The specular reflection of light rays via the reflective lateral surfaces of the light pipe can lead to mixing of the light and hence provide a more homogeneous output light pattern. Further, in embodiments in which multiple light sources generating light of different colors are used, such mixing of the light rays can provide color mixing, which can be useful in a variety of applications including entertainment lighting.

A light pipe in the form of a highly reflective tube, such as the above light pipe 102, can provide a number of advantages. For example, such a light pipe allows entry of light into the light pipe without losses (e.g., Fresnel losses) associated with an input surface of a solid light pipe. The Fresnel/surface losses occurring at the input surface of a solid light pipe can produce heat. Such heat can lead to the failure of plastic light pipes, e.g., via causing the melting of the light pipe, especially when the light pipe is used with a high power light source, such as a high power LED, e.g., an LED generating a light power greater than about 20 Watts.

Although glass light pipes can resist melting, they are expensive. Silicone rods can also resist melting, but silicone can attract dust and it also has a very high thermal expansion coefficient, which can affect the size of an air gap between the light pipe and a light source (such as an LED) that provides light to the light pipe, thereby adversely affecting the performance of a light module.

Figure 4:
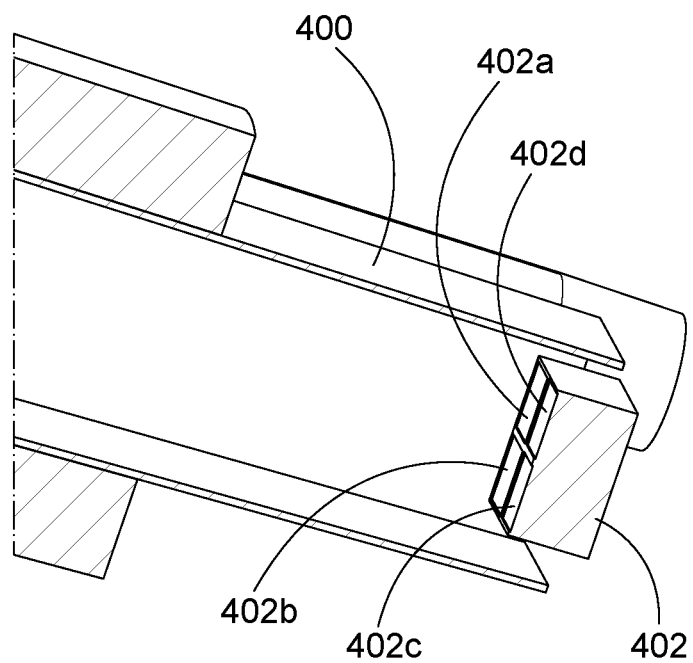
FIG. 4 is a partial perspective view of a hollow light guide formed by a film having four highly reflective lateral surfaces with a light source including four LEDs positioned within the interior of the light guide in a proximal section thereof.

Moreover, a hollow tube formed of a highly reflective film can allow extending the light beyond the output surface of a light source, such as an LED, that provides light to the light pipe. This can in turn allow collecting more of the light generated by the light source compared to the light collected from such a light source by a solid light pipe. By way of example, FIG. 4 shows a hollow light pipe 400 that includes four highly reflective lateral surfaces formed of a highly reflective surface of a film as discussed above.

In this embodiment, a light source 402 including four LEDs 402a, 402b, 402c, and 402d providing radiation at different colors is coupled to the holder 106 such that a proximal end of the hollow light pipe surrounds the light source, i.e., the light source is positioned within the interior of the light pipe at a proximal portion of the light pipe. This allows all of the light generated by the light source to be captured by the light pipe and be directed to the output of the light pipe, thereby increasing the light transmission efficiency of the light pipe.

In this embodiment, the light striking the highly reflective lateral surfaces of the light pipe undergoes specular reflection. While the reflectivity of a solid light pipe that operates based on the total internal reflection of light rays incident on its lateral surfaces can be theoretically 100%, any light striking such a lateral surface at an angle that would exceed the critical angle for total internal reflection would refract at the surface and escape the light pipe, typically at the first incident surface. This can lead to a lower efficiency of light transfer through the light pipe. In contrast, a light pipe according to various embodiments relies on a specular reflection of light incident on a highly reflective surface, which can reflect the light at any incident angle.

The assembly of a hollow reflective light pipe according to various embodiments within a bore of a holder can be achieved in a variety of different ways. By way of example, in some embodiments, the hollow reflective light pipe can be formed external to the holder and can then be inserted into the bore of the holder. By way of example, a frictional fit between the outer surfaces of the light pipe and the inner surface of the bore can maintain the light pipe within the bore.

Figure 5A:
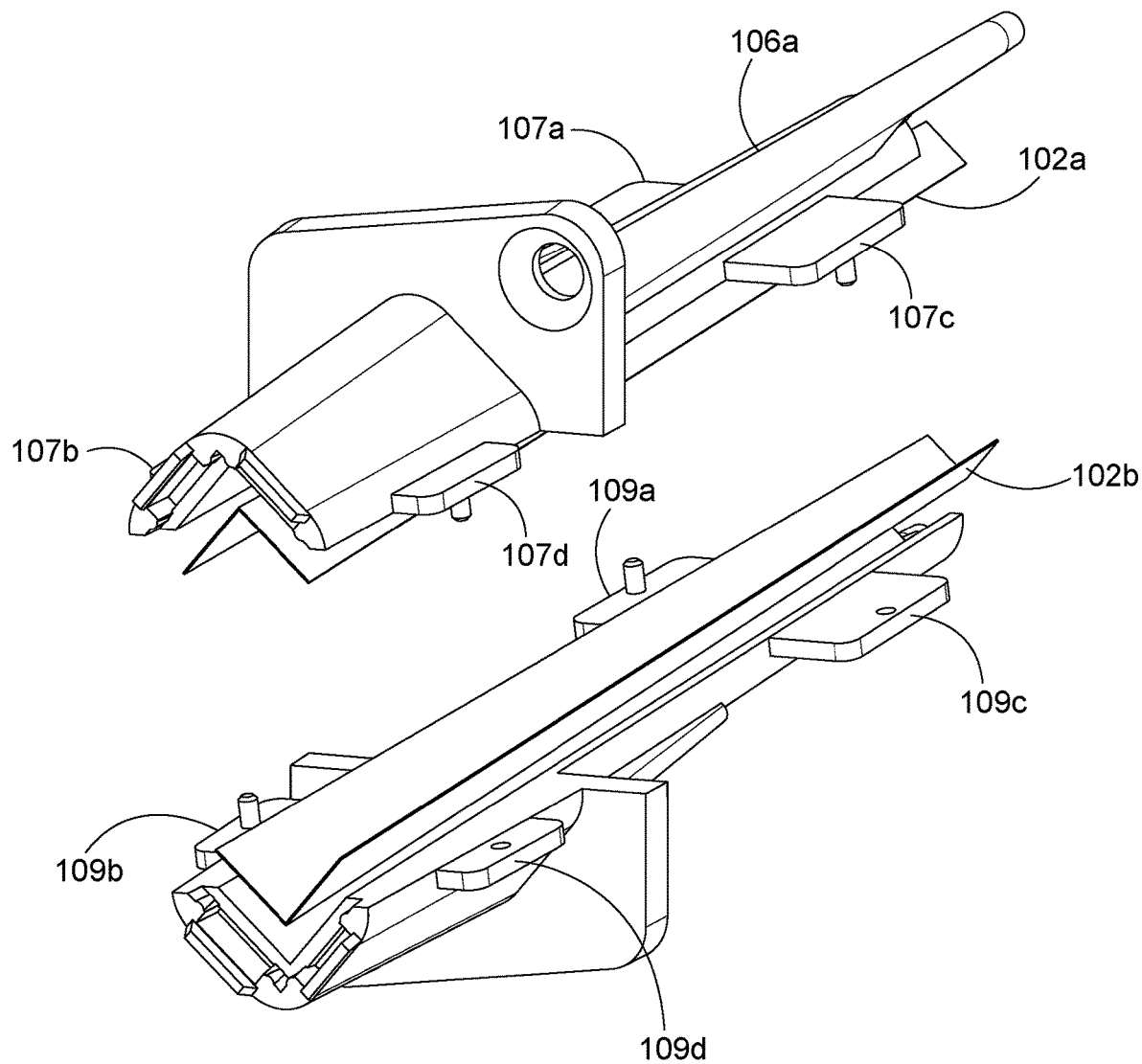
FIG. 5A shows two separate pieces of a holder that can be employed in embodiments of a light module according to the present teachings as well as two pieces of a film having a highly reflective surface, where each piece of the film is positioned within a groove provided by a respective piece of the holder.
Figure 5B:
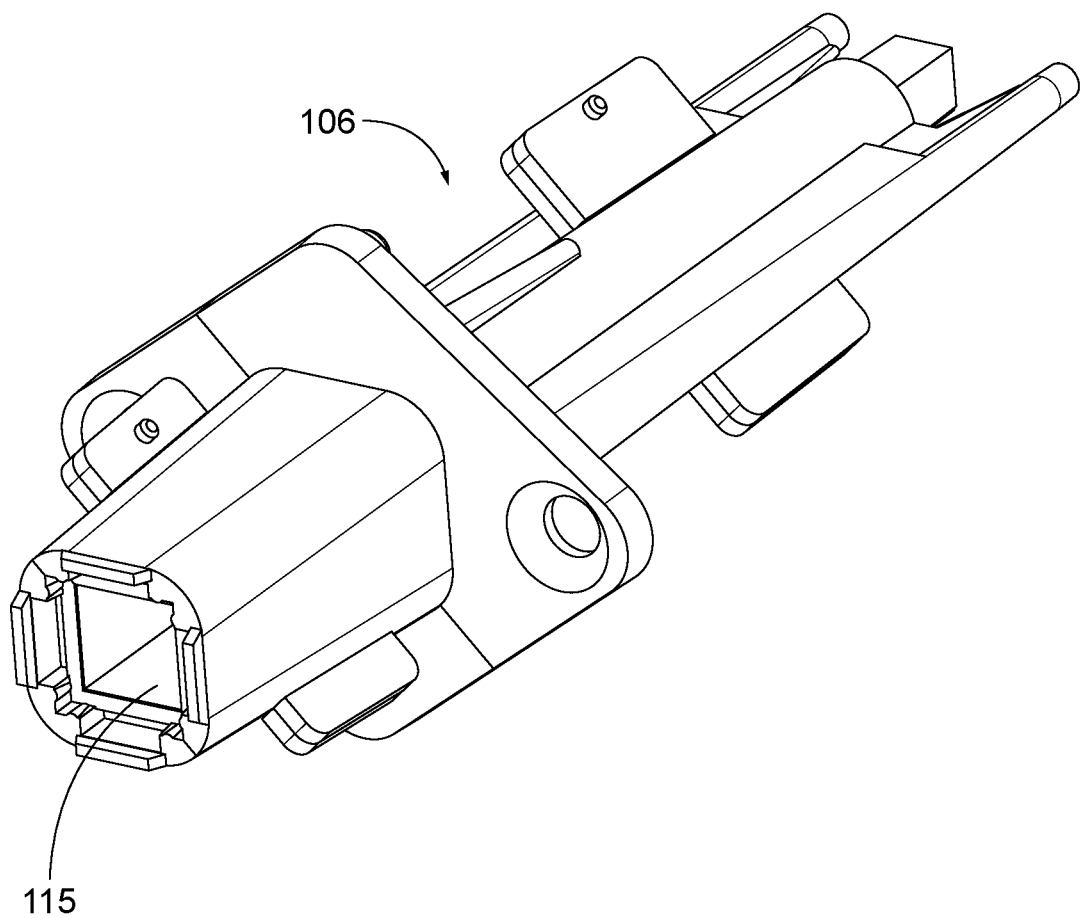
FIG. 5B shows an assembled light module formed by mechanically coupling the holder pieces depicted in FIG. 5A.

With reference to FIGS. 5A and 5B, in another embodiment, the assembly of a hollow light pipe within the bore of the holder can be achieved by fabricating a holder in two separate pieces such that when they are assembled together, they would capture and secure two portions of a reflective film within the bore. More specifically, FIG. 5A shows an implementation of the holder 106 that includes two pieces 106a/106b that can be mechanically coupled to one another. In this embodiment, the light pipe 102 can also be implemented as two pieces 102a/102b.

For assembling the light pipe within the holder, in this example, the light pipe piece 106a is positioned within a groove associated with the holder piece 106a and the light pipe piece 106b is positioned within a groove associated with the holder piece 106b. The two pieces of the holder, together with the respective portions of the light pipe, can be fixated together. More specifically, in this embodiment, the holder piece 106a includes four tabs 107a, 107b, 107c, and 107d and the holder piece 106b includes four respective tabs 109a, 109b, 109c, and 109d. The tabs 107c and 107d of the holder piece 106a include pins A1, and A2, which can engage with respective openings B1 and B2 provided in the tabs 109c and 109d of the holder piece 106b. Further, the tabs 109a and 109b of the holder piece 106b include pins B3 and B4, which can engage with respective openings A3 and A4 provided in the tabs 107a and 107b of the holder piece 106a. In this manner, the holder pieces 106a and 106b, together with the two pieces of the hollow reflective light pipe, can be joined together, as shown schematically in FIG. 5B. In this embodiment, the assembled holder 106 includes a recess 115 that can receive and retain the light-shaping element 112 discussed above (See, e.g., FIG. 11A).

Figure 6A:
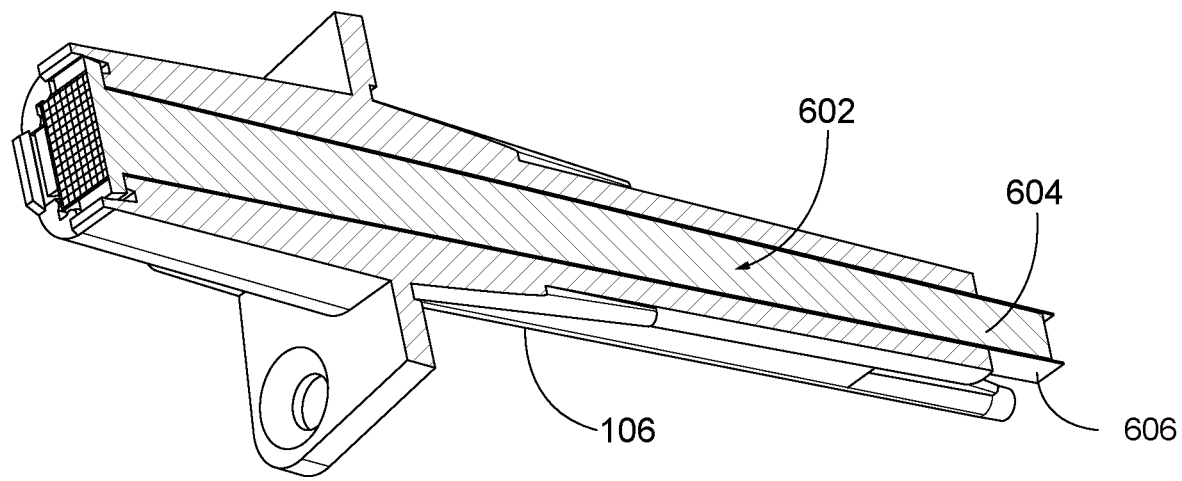
FIG. 6A is a partial perspective view of a light module according to an embodiment having a light guide comprising a solid waveguide and a film having a highly reflective surface that surrounds the solid waveguide.
Figure 6B:
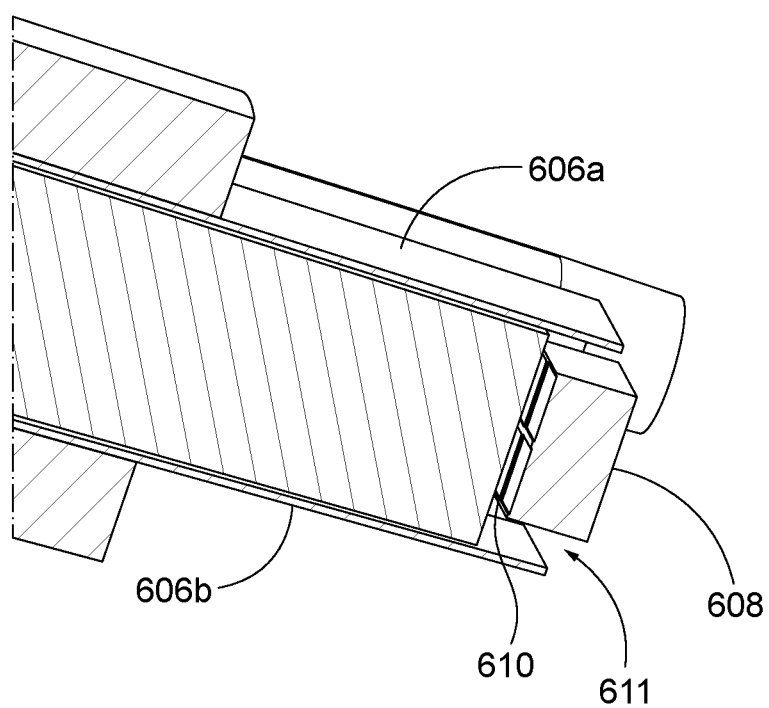
FIG. 6B shows a proximal section of the light module illustrated in FIG. 6A, further illustrating a light source coupled to the light guide, FIGS. 6C-6I schematically depict various steps in an example of a process for assembling light modules according to various embodiments.

In some embodiments, a highly reflective film, such as those discussed above, can be used to cover the external lateral surfaces of a solid light waveguide to form a composite light pipe. By way of example, with reference to FIGS. 6A and 6B, a light module 600 includes a light pipe 602 having two parts, namely, a solid light waveguide 604 and a film 606 having a highly reflective inner surface that surrounds the external lateral surfaces of the solid light waveguide. In this embodiment, the highly reflective film includes four sides (two of which 606a/606b are visible in the figure), each of which covers and is in contact with a lateral external surface of the solid waveguide. In this embodiment, the proximal end of the reflective film extends beyond the proximal end of the solid waveguide to form a cavity 611 in which the light source 608 can be positioned.

The solid light waveguide includes an input surface 604a through which light generated by the light source 608 can be introduced into the solid waveguide, where the light source 608 is coupled to a proximal end of the holder 106 and in this case includes four LED lighting elements each of which provides light of a different color. A gap 610 separates the light source from the input surface of the solid waveguide to facilitate dissipation of the heat generated by the light source. The lateral surfaces of the solid waveguide extend from its input surface to its output surface.

Figure 6C:
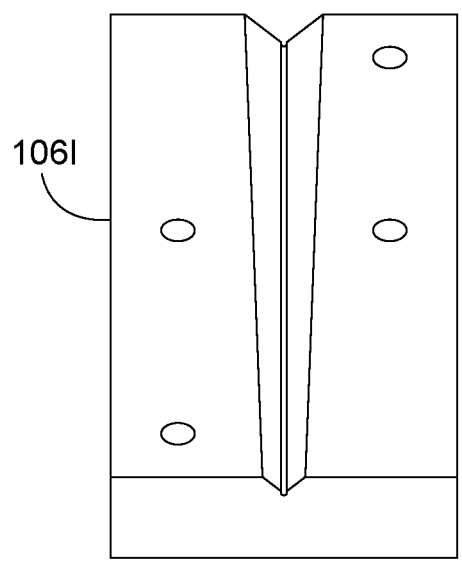
Figure 6D:
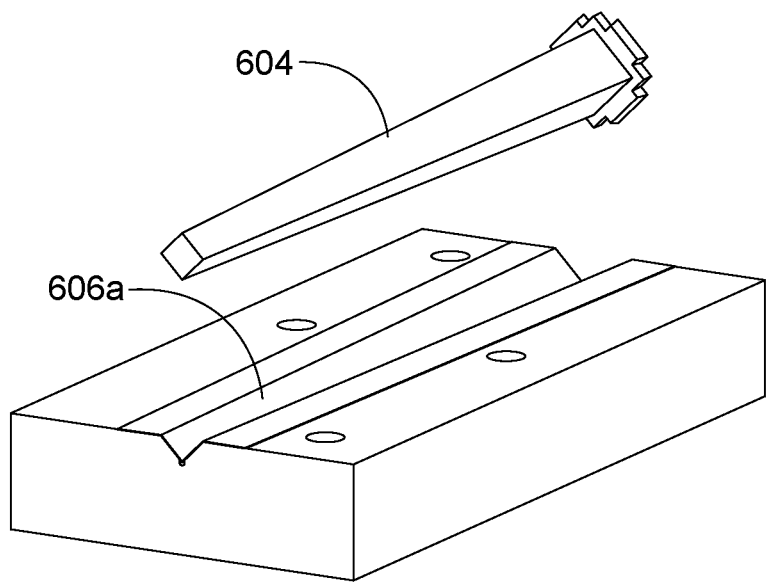
Figure 6E:
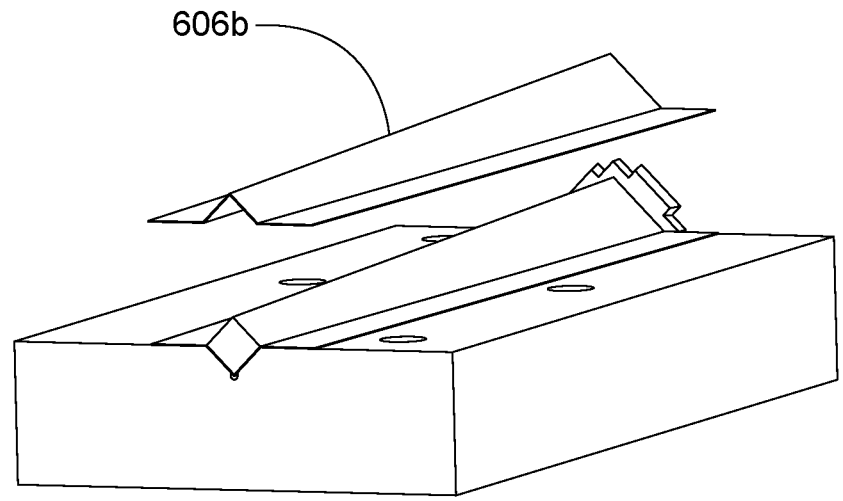
Figure 6F:
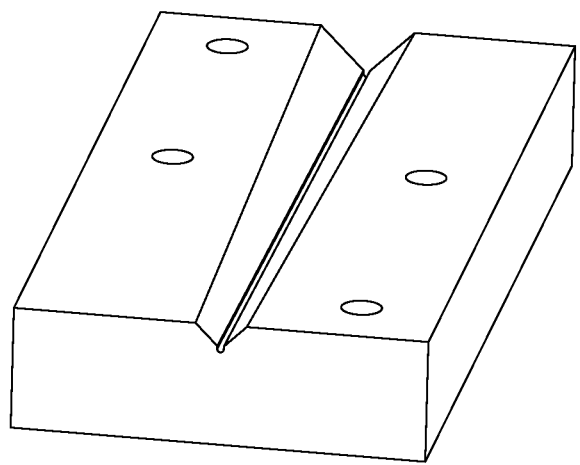
Figure 6G:
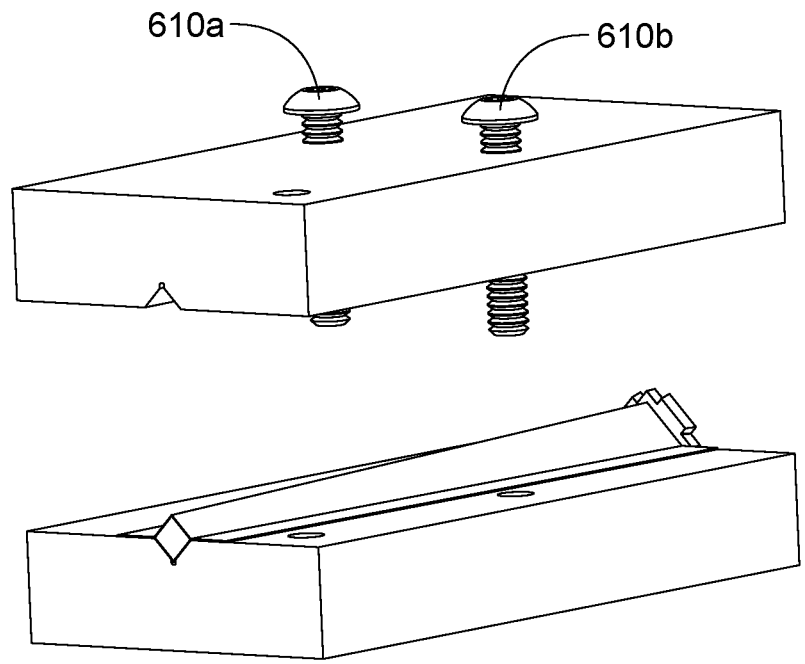
Figure 6H:
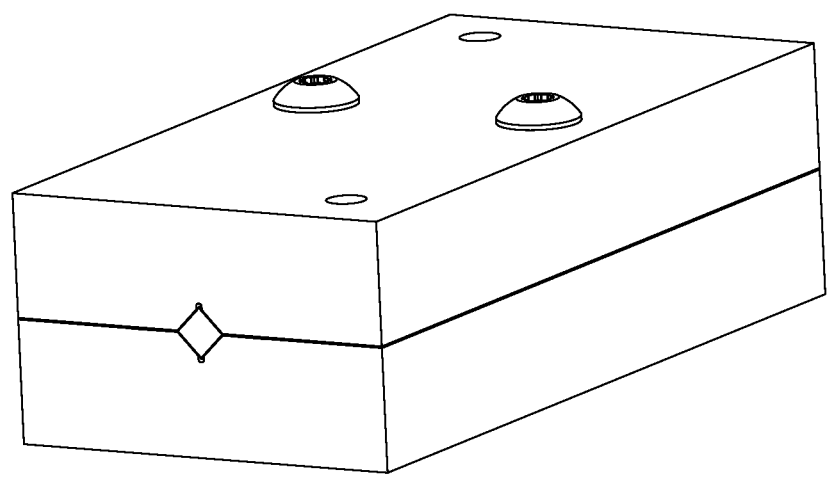
Figure 6I:
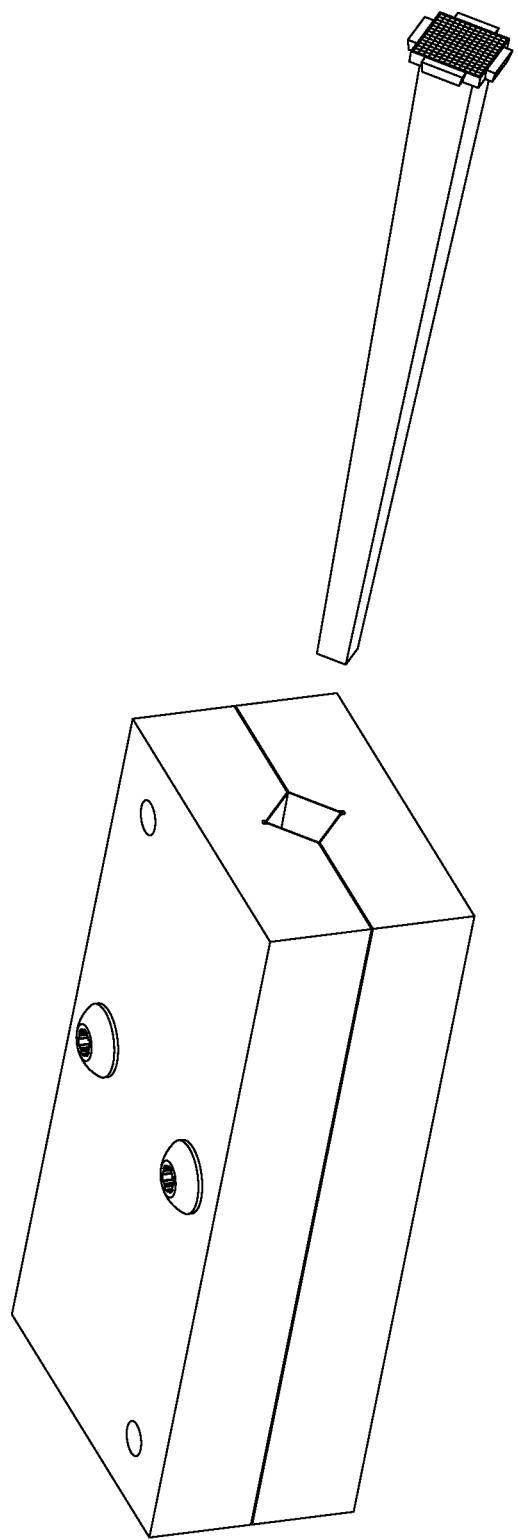

With reference to FIGS. 6C-6I, a process for assembling a light module according to various embodiments, such as the above light module 600, can start by forming a half of the holder (herein referred to as the bottom/lower half 106l) as shown in FIG. 6C followed by placing a pre-cut piece of the reflective film 606a in the V-groove formed on the top surface of the bottom half of the holder (FIG. 6D). The pre-cut piece of the reflective film can be in the form of V-shaped film and can be pushed into the V-groove of the surface or can simply be a flat piece placed over the top surface of the bottom half of the holder. Then, the solid light waveguide 604 can be placed over the film. In the case in which a flat piece of the reflective film is placed over the top surface of the bottom half of the holder, the solid light waveguide can be placed over the film and pushed down to force a portion of the film into the V-groove. Another pre-cut piece of the reflective film (606b) can then be placed on top of the light-pipe (FIG. 6E) followed by placing the other half of the holder (herein referred to as the top or upper half 606b) on the top of the other pre-cut piece. At this stage, the parts can be fixated together via heat-staking, or other techniques, such rivets, gluing, or welding, etc. By way of example, FIG. 6G shows the use of two fasteners 610a/610b for connecting the upper half of the holder to its lower half to form the assembled light module shown in FIG. 6H. The holder can include undercuts that could accept the flange of the light pipe to prevent the light pipe from sliding out of the assembly. As shown in FIG. 6I, in some cases, the solid light guide can be removed from the assembly shown in FIG. 6H to leave behind the reflective film, which would provide a highly reflective, hollow waveguide.

It is noted that the light modules 100 and 200 depicted in FIGS. 2 and 3 can be assembled in a similar fashion, but with the use of a polymeric mandrel, e.g., Teflon® or Delin mandrel, in place of the solid light pipe. The microlens array 113 or the partial light pipe 202 can be fixated into the holder-plus-film assembly, e.g., via heat-staking.

The solid light waveguide can be formed of a variety of suitable materials, such as plastic, glass, silicone, etc. Further, the film surrounding the external lateral surfaces of the solid waveguide can be formed of a material, such as those discussed above, that provides a high specular reflectivity, e.g., greater than about 95%, or greater than about 96%, or greater than about 97%, or greater than about 98%, in a target wavelength range, e.g., in a range of about 380 nm to about 780 nm.

In use, the light generated by the light source 608 enters the solid waveguide via its input surface either directly or via specular reflection at the walls of the cavity 611. A portion of the light rays passes through the waveguide without striking its lateral surfaces and exits the waveguide via its output surface. Another portion of the light rays entering the solid waveguide strikes its lateral surfaces and may escape from the solid waveguide to be received by one or more of the highly reflective surfaces of the film 606 and be reflected back into the waveguide. Such light rays may undergo one or more such reflections as they propagate from the waveguide's input surface to its output surface through which the light rays exit the waveguide. Such reflections of the light rays can cause mixing thereof, and in particular the mixing of the light generated by the different LEDs to provide a desired color temperature of the output light.

The use of the reflective film in conjunction with the solid waveguide can provide certain advantages. For example, as also noted above, in absence of the highly reflective film, some light rays that strike the lateral surfaces of the solid waveguide at angles greater than the critical angle for total internal reflection can escape the waveguide, thereby reducing the light pipe's efficiency.

Figure 7:
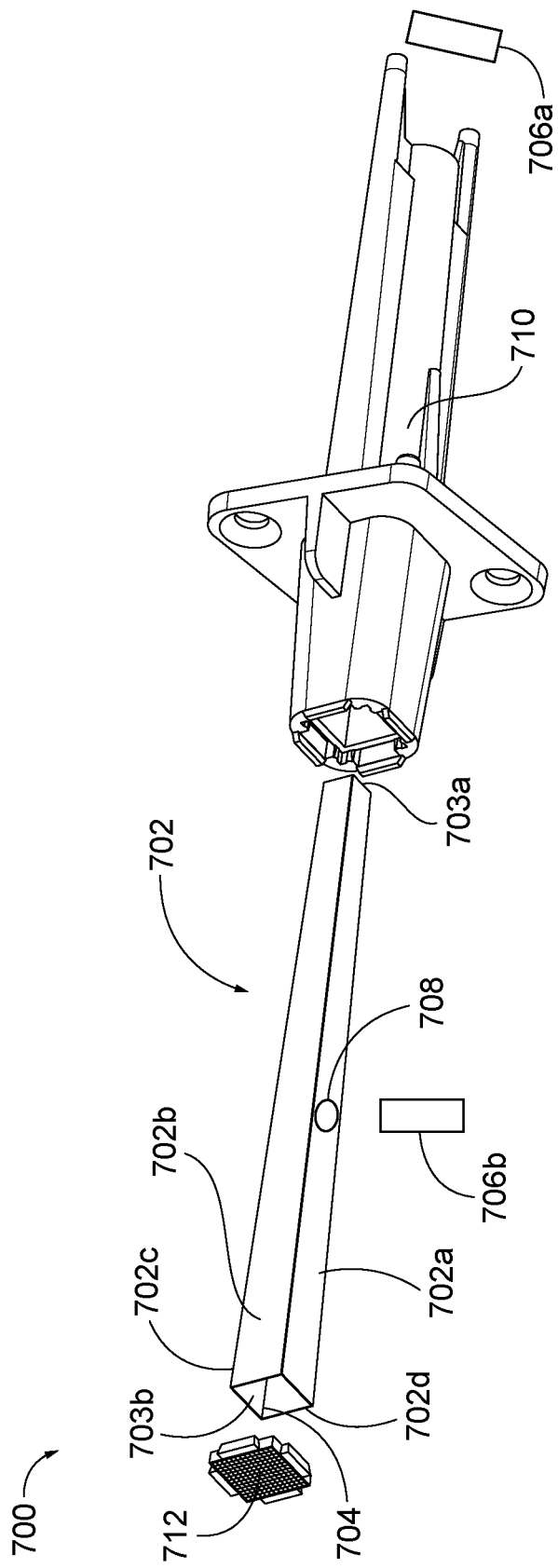
FIG. 7 is a schematic exploded perspective view of a light module according to another embodiment having a light guide formed of a film having a highly reflective inner surface, where the light guide includes an open proximal end for receiving light from a first light source and an opening formed in a lateral surface thereof for receiving light from a second light source, and FIG. 8 schematically depicts an optical system according to an embodiment of the present teachings, which includes a laser-driven phosphor-converted white light source for generating white light.

FIG. 7 schematically depicts a light module 700 according to another embodiment, which includes a hollow light guide 702 that includes four lateral sides 702a, 702b, 702c, and 702d each of which extends from an input end 703a of the light guide to an output end 703b of the light guide. Each of the sides includes a highly reflective inner surface, such as highly reflective inner surface 704, that provides specular reflection of light rays incident thereon. A first light source 706a positioned in proximity of the input end 703a of the light guide generates light that is received by the light guide. While in this embodiment the first light source 706a is positioned external to the light guide, in other embodiments the first light source 706a can be positioned within the hollow interior of the light guide. Further, the first light source 706a can include multiple light-emitting elements, e.g., multiple LEDs, generating light of different colors.

With continued reference to FIG. 7, in this embodiment, an opening 708 provided in lateral side 702a of the light guide allows the coupling of light generated by a second light source 706b into the interior of the light guide. The light emitted by the second light source 706b entering the light guide is specularly reflected by the highly reflective surfaces of the lateral sides of the light guide and is mixed with the light associated with the first light source. Since the reflections at the highly reflective surfaces of the light guide are specular reflections, rather than total internal reflections, the rays undergo reflection regardless of their angles of incidence. In a light guide that relies on total internal reflection for causing the reflection of light incident on its lateral surfaces, the light rays that strike a lateral surface at angles greater than the critical angle for total internal reflection can exit the light guide. In contrast, in the light guides according to the present teachings that rely on specular reflection of light, all rays incident on the highly reflective surfaces can undergo reflection, regardless of their angle of incidence, and remain within the light guide to be efficiently mixed with the light generated by the first light source.

Similar to the previous embodiments, in this embodiment, the light guide 702 can be positioned within a holder 710 and its output end can be optically coupled to a light-shaping element 712.

In some embodiments, a highly reflective film is employed in a light-delivery system for directing light generated via one or more light sources into a target direction. By way of example, in some such embodiments, the highly reflective film can form at least a portion of a light-delivery component for delivering to an optical component, e.g., for coupling the light to an optical fiber.

Figure 8:
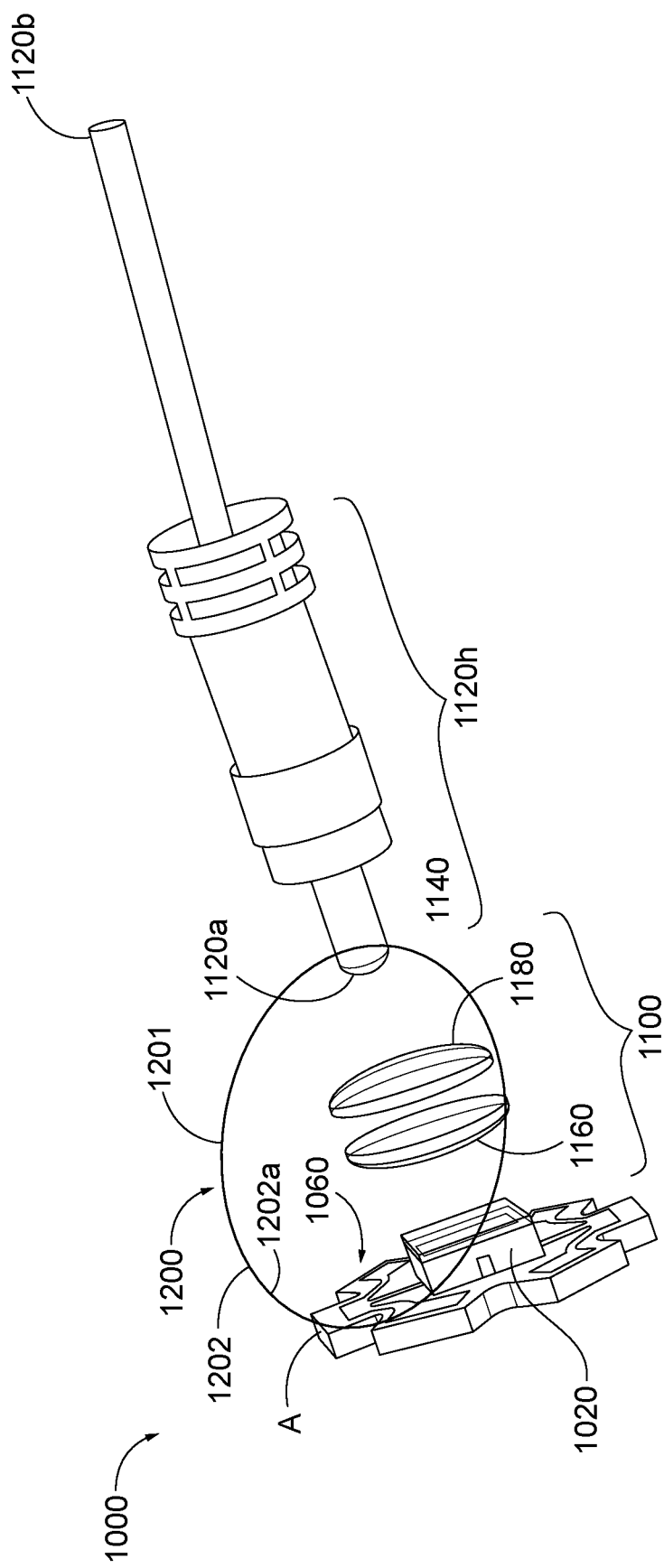

By way of example, FIG. 8 schematically depicts an optical system 1000 according to an embodiment of the present teachings, which includes a laser-driven phosphor-converted white light source 1020 for generating white light. The light source 1020 is mounted on a printed circuit board (PCB). The optical system 1000 further includes a red light emitting diode (LED) 1060 that generates red light, e.g., at a wavelength of about 635 nm. The optical system 1000 further includes a light-delivery system 1100 for delivering the light emitted by the white light source 1020 and the red LED 1060 into an input port 1120*a* of an optical fiber 1140. The optical system 1000 can further include a housing 1120*h* having a lumen, in which the optical fiber 1140 can be disposed.

In this embodiment, the light-delivery system 1100 includes a pair of convergent lenses 1160/1180 for focusing the light generated by the white light source 1020 into the optical fiber 1140. In some embodiments, the convergent lenses 1160/1180 are configured and positioned relative to the white light source to image the emitting surface of the white light source onto the input port of the optical fiber. By way of example, in some embodiments, each of the lenses 1160/1180 can have an optical power in a range of about 10 Diopters to about 100 Diopters.

The light-delivery system 1100 further includes an elliptical reflector 1200 having an elliptical housing 1201 and a highly reflective film 1202 that covers an inner surface of the elliptical housing so as to provide a highly reflective elliptical surface 1202*a* that is optically coupled to the red LED 1060 to transfer the red light emitted by the red LED 1060 into the optical fiber 1140. Specifically, the highly reflective elliptical surface can be positioned such that the red LED is located at or in proximity of one focal point (A) of the elliptical surface 1202*a*, e.g., within about 5 millimeters of the focal point, and the input port (herein also referred to as the input surface) of the optical fiber 1140 is located at or in proximity of the conjugate of the focal point (B) of the highly reflective elliptical surface, e.g., within about 5 millimeters of that focal point. In this manner, the highly reflective elliptical surface efficiently transfers the light emitted by the red LED into the input port 1120*a* of the optical fiber 1140. The light from the two light sources coupled into the optical fiber pass through the optical fiber and exit the fiber via a distal end 1120*b* thereof for illuminating a target.

The systems and methods according to various embodiments of the present teachings can have a wide range of applications, including, for example, in spot lighting, customizable/adjustable lighting systems, household lighting, flashlights, wearable headlamps or other body-mounted lighting, among others.

Any appended claims are incorporated by reference herein and are considered to represent part of the disclosure and detailed description of this patent application. Moreover, it should be understood that the features illustrated or described in connection with any exemplary embodiment may be combined with the features of any other embodiments. Such modifications and variations are intended to be within the scope of the present patent application.

What is claimed is:

1. An optical system, comprising:
a light guide configured to receive light from at least one light source, the light guide having an output end through which light exits the light guide, the light guide further having at least one highly reflective film positioned to provide, inside the light guide, specular reflection of at least a portion of the light after entering the light guide,
wherein the highly reflective film exhibits a specular reflectance of at least about 95% for light with one or more wavelengths in a range of about 380 nm to about 780 nm.

2. The optical system of claim 1, wherein the highly reflective film exhibits the specular reflectance for incident angles in a range of about 0 degrees to about 90 degrees.

3. The optical system of claim 2, wherein the highly reflective film comprises a one-dimensional photonic crystal.

4. The optical system of claim 1, wherein the at least one light source comprises a plurality of light sources.

5. The optical system of claim 4, wherein the at least one highly reflective film reflects at least a portion of light associated with each of the plurality of light sources incident thereon so as to cause mixing of the light associated with the plurality of light sources.

6. The optical system of claim 1, wherein the light guide includes a hollow interior surrounded by the at least one highly reflective film.

7. The optical system of claim 6, wherein the at least one highly reflective film includes a plurality of highly reflective films positioned relative to one another so as to form the light guide with a polygonal cross section.

8. The optical system of claim 6, wherein the at least one light source is disposed in the hollow interior.

9. The optical system of claim 6, wherein the light guide has a cross-sectional shape that is circular, elliptical, or irregular.

10. The optical system of claim 6, further comprising a holder configured to hold the light guide, wherein the highly reflective film is independently removable from the holder.

11. The optical system of claim 10, wherein:
the holder has an inner surface; and
the highly reflective film has an outer surface configured to be in contact with the inner surface of the holder when the holder holds the light guide.

12. The optical system of claim 6, wherein the at least one light source is disposed inside the hollow interior.

13. The optical system of claim 1, wherein said light guide comprises a tubular structure.

14. The optical system of claim 1, wherein the light guide comprises a solid waveguide having a surface on which the highly reflective film is placed.

15. The optical system of claim 1, wherein the at least one highly reflective film exhibits a reflectance of at least about 96%.

16. The optical system of claim 1, wherein the at least one highly reflective film exhibits a reflectance of at least about 97%.

17. The optical system of claim 1, wherein the at least one highly reflective film exhibits a reflectance of at least about 98%.

18. The optical system of claim 1, wherein the at least one highly reflective film exhibits a reflectance of at least about 99%.

19. The optical system of claim 1, wherein the at least one highly reflective film exhibits a reflectance of about 99.9%.

20. The optical system of claim 1, wherein the light guide includes a side opening positioned between an input end of the light guide and the output end of the light guide for receiving light from at least another light source such that at least a portion of the light received from the at least another light source is reflected by the highly reflective film to be mixed with the light received from the at least one light source.

21. The optical system of claim 1, wherein the at least one light source is disposed on a PCB and an input end of the light guide is coupled to the PCB.

22. The optical system of claim 1, wherein the at least one light source comprises an LED having a power consumption of about 1 Watt to about 100 Watts.

23. The optical system of claim 1, wherein the light guide comprises a plurality of reflective lateral walls.

24. The optical system of claim 23, wherein the plurality of reflective lateral walls are formed of the highly reflective film.

25. The optical system of claim 23, wherein the highly reflective film includes a one-dimensional photonic crystal reflective film.

26. The optical system of claim 23, wherein the plurality of reflective lateral walls consist essentially of the highly reflective film.

27. The optical system of claim 26, wherein the highly reflective film comprises an Enhanced Specular Reflective (ESR) film.

28. The optical system of claim 23, wherein the highly reflective film comprises an Enhanced Specular Reflective (ESR) film.

29. The optical system of claim 23, wherein the plurality of reflective lateral walls define a polygonal cross-sectional profile.

30. The optical system of claim 29, wherein the polygonal cross-sectional profile is square, hexagonal, octagonal, or star-shaped.

31. The optical system of claim 23, wherein the plurality of reflective lateral walls is implemented as two pieces.

32. The optical system of claim 23, wherein the plurality of reflective lateral walls includes a pre-cut piece of the highly reflective film.

33. The optical system of claim 32, wherein the pre-cut piece of the highly reflective film is a V-shaped film.

34. The optical system of claim 32, wherein the pre-cut piece of the highly reflective film is a first pre-cut piece of the highly reflective film and the plurality of reflective lateral walls further includes a second pre-cut piece of the highly reflective film.

35. The optical system of claim 34, wherein the first pre-cut piece of the highly reflective film and the second pre-cut piece of the highly reflective film are fixated together via heat-staking, rivets, gluing, or welding.

36. An optical system, comprising:
a light guide having:
a hollow interior configured to receive light from at least one light source,
a specularly highly reflective film surrounding the hollow interior, and
an open output end through which the light exits the hollow interior; and
a light-shaping element having:
an input surface optically coupled to the open output end of the light guide so as to receive at least a portion of the light exiting the light guide, and
an output surface through which the light exits the light-shaping element,
wherein the specularly highly reflective film exhibits a reflectance of at least about 95% for light having one or more wavelengths in a range of about 380 nm to about 780 nm.

37. The optical system of claim 36, further comprising:
a projection lens optically coupled to the output surface of the light-shaping element to receive light therefrom.

38. The optical system of claim 36, wherein the specularly highly reflective film is shaped to provide the light guide.

39. The optical system of claim 38, wherein said light guide has a polygonal cross-sectional profile.

40. The optical system of claim 36, further comprising a holder having an inner bore in which said light guide is positioned.

41. The optical system of claim 36, wherein the specularly highly reflective film exhibits a reflectance in a range of about 95% to about 99.9% for light having a wavelength in the range of about 380 nm to about 780 nm.

42. The optical system of claim 36, wherein the specularly highly reflective film has a thickness of about 60 μm to about 90 μm.

43. The optical system of claim 36, wherein the specularly highly reflective film exhibits the reflectance for any polarization of incident light.

44. The optical system of claim 36, wherein the light guide has any of a circular, a polygonal, or an oval cross-sectional profile.

45. The optical system of claim 36, wherein at least one of the input surface and the output surface of the light-shaping element comprises a plurality of microlenses.

46. The optical system of claim 45, wherein said microlenses are hemispherical.

* * * * *